(12) United States Patent
Fukuma et al.

(10) Patent No.: US 9,388,935 B2
(45) Date of Patent: Jul. 12, 2016

(54) DISPLAY DEVICE

(75) Inventors: Yohei Fukuma, Chiba (JP); Tomoaki Takuma, Kanagawa (JP); Shigeru Yoshida, Tokyo (JP); Tetsu Sumii, Kanagawa (JP); Keita Hibi, Tokyo (JP)

(73) Assignee: Sony Corporation (JP)

( * ) Notice: Subject to any disclaimer, the term of this patent is extended or adjusted under 35 U.S.C. 154(b) by 980 days.

(21) Appl. No.: 13/326,901

(22) Filed: Dec. 15, 2011

(65) Prior Publication Data

US 2012/0162878 A1 Jun. 28, 2012

(30) Foreign Application Priority Data

Dec. 28, 2010 (JP) .................. P2010-293691

(51) Int. Cl.
| | |
|---|---|
| H05K 5/00 | (2006.01) |
| F16M 11/22 | (2006.01) |
| F16M 11/00 | (2006.01) |
| F16M 13/02 | (2006.01) |
| G02F 1/13 | (2006.01) |
| A47B 81/00 | (2006.01) |
| G06F 1/16 | (2006.01) |

(52) U.S. Cl.
CPC .............. *F16M 11/22* (2013.01); *F16M 11/00* (2013.01); *F16M 13/02* (2013.01); *F16M 13/027* (2013.01); *F16M 2200/08* (2013.01)

(58) Field of Classification Search
CPC ... G06F 1/1616; G06F 1/1656; G06F 1/1632; G06F 1/1626; G06F 1/169; G06F 1/1635; G06F 1/166; Y02E 60/12
USPC ........................................................ 348/836
See application file for complete search history.

(56) References Cited

U.S. PATENT DOCUMENTS

| | | | | |
|---|---|---|---|---|
| 6,134,103 A | * | 10/2000 | Ghanma | F16M 11/24 248/917 |
| 6,288,372 B1 | * | 9/2001 | Sandberg | H05B 3/56 219/544 |
| 8,360,536 B2 | * | 1/2013 | Garg | H02G 3/0481 108/50.02 |
| 8,743,203 B2 | * | 6/2014 | Karner | B29C 45/0017 340/461 |
| 2009/0185340 A1 | * | 7/2009 | Ji | B29C 45/14786 361/679.21 |
| 2010/0321591 A1 | * | 12/2010 | Onomatsu | H01B 7/0823 348/737 |
| 2011/0042120 A1 | * | 2/2011 | Otsuka | H01P 3/00 174/113 R |
| 2012/0162566 A1 | * | 6/2012 | Shimomichi | G02F 1/133308 349/58 |

FOREIGN PATENT DOCUMENTS

JP     2009-031624 A    2/2009

* cited by examiner

*Primary Examiner* — Sath V Perungavoor
*Assistant Examiner* — Howard D Brown, Jr.
(74) *Attorney, Agent, or Firm* — Lerner, David, Littenberg & Krumholz & Mentlik, LLP

(57) ABSTRACT

A display device includes a display main body having a housing having an opening formed through the front surface and a display unit attached to the housing to close the opening and displaying an image, a stand base placed on a mounting surface, and at least one support connected to the display main body at one end and connected to the stand base at the other end, in which the support includes a cable inputting/outputting power or signals to/from the display main body and a coating covering the cable.

18 Claims, 22 Drawing Sheets

DISPLAY DEVICE

CROSS-REFERENCE TO RELATED APPLICATION

The present application claims priority from Japanese Patent Application No. JP 2010-293691 filed in the Japanese Patent Office on Dec. 28, 2010, the entire content of which is incorporated herein by reference.

BACKGROUND

The present disclosure relates to the technical field of display devices. In detail, the present disclosure relates to a technical field that makes it possible to improve stability in holding a display main body and improve space efficiency by holding the display main body with a support member having a cable and a coating that covers the cable.

Display devices, such as a television receiver, have consistently been made thinner recently such that the width in the front-rear direction of the display main body decreases. Since it is difficult to vertically place a thinner display main body on a mounting surface such as a holder or a floor, the display main body of the vertically holding type by using a stand or metal clasps on a wall are increasing.

Further, in the display devices, there are also the types of being placed on a wall by a rack provided with a clasp against a wall or suspended by a wire from the ceiling.

In those display devices, for example, there is a type of holding the display main body, using a stand with a support member (for example, see Japanese Unexamined Patent Application Publication No. 2009-31624).

In the display device disclosed in Japanese Unexamined Patent Application Publication No. 2009-31624, a stand base (stand bed) and a support (pole) protruding upward from the stand base are provided and an attachment portion is formed at the upper end of the support, such that the lower end of a display main body is attached to the attachment portion by screws or the like and the display main body is vertically held by the stand.

SUMMARY

However, in the display device disclosed in Japanese Unexamined Patent Application Publication No. 2009-31624, although the display main body is stably held by the stand, it is necessary to separately prepare a power cable for supplying power to the display main body or a cable for inputting/outputting signals to/from the display main body and the cables are exposed to the outside of the display main body while sagging from the display main body.

When the cables are exposed to the outside of the display main body, the cables interfere with the work of unpacking the display device or the work of disposing it on a mounting surface, a floor, or a wall, while unnecessary force is applied to the cables and the cables may be broken.

Further, since the cables are exposed to the outside of the display main body, the space efficiency correspondingly decreases and the appearance deteriorates.

It is desirable to provide a display device that makes it possible to ensure stability in holding a display main body and improve space efficiency by removing the problems described above.

A display device according to an embodiment of the present disclosure includes: a display main body having a housing having an opening formed through the front surface and a display unit attached to the housing to close the opening and displaying an image; a stand base placed on a mounting surface; and at least one support connected to the display main body at one end and connected to the stand base at the other end, in which the support includes a cable inputting/outputting power or signals to/from the display main body and a coating covering the cable.

Therefore, in the display device, the display main body is held by the stand base and the support, with the cable disposed in the support.

In the display device described above, the coating may be made of a material in which a carbon fiber used as a reinforcing material is contained in resin used as a base material.

Since the coating is made of a material in which a carbon fiber used as a reinforcing material is contained in resin used as a base material, high strength is ensured for the support.

In the display device described above, the coating may include an inner coating covering the cable and an outer coating covering the outer circumferential surface of the inner coating.

Since the coating includes an inner coating covering the cable and an outer coating covering the outer circumferential surface of the inner coating, the coating is provided with a double structure, such that it is possible to select different materials for the inner coating and the outer coating.

In the display device described above, one support may be disposed and one end of the support may be connected to the center portion in the left-right direction of the display main body.

Since one support is disposed and one end of the support is connected to the center portion in the left-right direction of the display main body, good balance is ensured in the left-right direction in the weight of the display main body.

In the display device described above, one end of the support may be connected to the lower surface of the display main body.

Since one end of the support is connected to the lower surface of the display main body, the display main body is supported from below.

In the display device described above, the thickness of one end of the support may increase toward the display main body.

Since the thickness of one end of the support increases toward the display main body, strength of the joint where the support is connected to the display main body increases.

In the display device described above, the support has the left-right width larger than the front-back width.

Since the left-right width is larger than the front-back width in the support, the front-back and left-right sizes of the support match the front-back and left-right sizes of the thin display main body.

In the display device described above, a plurality of supports may be disposed.

Since a plurality of supports is disposed, it is possible to distribute and dispose a plurality of cables in the supports, one by one.

In the display device described above, the housing of the display main body and the coating of the support may be integrally formed.

Since the housing of the display main body and the coating of the support are integrally formed, the connection strength of the support to the display main body increases.

In the display device described above, the stand base and the coating of the support may be integrally formed.

Since the stand base and the coating of the support are integrally formed, strength of the joint between the stand base and the support increases.

A display device according to another embodiment of the present disclosure includes: a display main body having a housing having an opening formed through the front surface and a display unit attached to the housing to close the opening and displaying an image; an attachment base attached to a ceiling or a wall; and at least one support connected to the display main body at one end and connected to the attachment base at the other end, in which the support includes a cable inputting/outputting power or signals to/from the display main body and a coating covering the cable.

Therefore, in the display device, the display main body is held by the attachment base and the support, with the cable disposed in the support.

In the display device described above, the coating may be made of a material in which a carbon fiber used as a reinforcing material is contained in resin used as a base material.

Since the coating is made of a material in which a carbon fiber used as a reinforcing material is contained in resin used as a base material, high strength is ensured for the support.

In the display device described above, the coating may include an inner coating covering the cable and an outer coating covering the outer circumferential surface of the inner coating.

Since the coating includes an inner coating covering the cable and an outer coating covering the outer circumferential surface of the inner coating, the coating is provided with a double structure, such that it is possible to select different materials for the inner coating and the outer coating.

In the display device described above, one support may be disposed and one end of the support may be connected to the center portion in the left-right direction of the display main body.

Since one support is disposed and one end of the support is connected to the center portion in the left-right direction of the display main body, good balance is ensured in the left-right direction in the weight of the display main body.

In the display device described above, one end of the support may be connected to the upper surface or the lower surface of the display main body.

Since one end of the support is connected to the upper surface or the lower surface of the display main body, the display main body is supported from above or below.

In the display device described above, the thickness of one end of the support may increase toward the display main body.

Since the thickness of one end of the support increases toward the display main body, strength of the joint where the support is connected to the display main body increases.

In the display device described above, the support has the left-right width larger than the front-back width.

Since the left-right width is larger than the front-back width in the support, the front-back and left-right sizes of the support match the front-back and left-right sizes of the thin display main body.

In the display device described above, a plurality of supports may be disposed.

Since a plurality of supports is disposed, it is possible to distribute and dispose a plurality of cables in the supports, one by one.

In the display device described above, the housing of the display main body and the coating of the support may be integrally formed.

Since the housing of the display main body and the coating of the support are integrally formed, the connection strength of the support to the display main body increases.

In the display device described above, the attachment base and the coating of the support may be integrally formed.

Since the attachment base and the coating of the support are integrally formed, strength of the joint between the attachment base and the support increases.

A display device according to an embodiment of the present disclosure includes: a display main body having a housing having an opening formed through the front surface and a display unit attached to the housing to close the opening and displaying an image; a stand base placed on a mounting surface; and at least one support connected to the display main body at one end and connected to the stand base at the other end, in which the support includes a cable inputting/outputting power or signals to/from the display main body and a coating covering the cable.

Therefore, since the cable is disposed in the support, it is possible to improve spatial efficiency, with the display main body stably held.

In the display device described above, the coating is made of a material in which a carbon fiber used as a reinforcing material is contained in resin used as a base material.

Therefore, it is possible to ensure high strength for the support with the thickness decreased, such that it is possible to keep the display main body stably held.

In the display device described above, the coating includes an inner coating covering the cable and an outer coating covering the outer circumferential surface of the inner coating.

Therefore, the coating is provided with a double structure and the selection range of the material of the coating increases, such that it is possible to improve the degree of freedom in design.

In the display device described above, one support is disposed and one end of the support is connected to the center portion in the left-right direction of the display main body.

Therefore, good balance is ensured in the left-right direction in the weight of the display main body, such that it is possible to keep the display main body stably held.

In the display device described above, one end of the support may be connected to the lower surface of the display main body.

The display main body is supported from below, it is possible to keep the display main body stably held.

In the display device described above, the thickness of one end of the support increases toward the display main body.

Therefore, strength of the joint where the support is connected to the display main body increases, such that it is possible to keep the display main body stably held.

In the display device described above, the support has the left-right width larger than the front-back width.

Therefore, the front-back and left-right sizes of the support match the front-back and left-right sizes of the thin display main body, particularly, the display main body is prevented from inclining in the left-right direction, such that it is possible to keep the display main body stably held.

In the display device described above, a plurality of supports is disposed.

Therefore, it is possible to distribute and dispose a plurality of cables in the supports, one by one, and accordingly, the thickness of the support can be reduced.

In the display device described above, the housing of the display main body and the coating of the support are integrally formed.

Therefore, it is possible to reduce the number of parts and the connection strength of the support to the display main body increases, such that it is possible to keep the display main body stably held.

In the display device described above the stand base and the coating of the support are integrally formed.

Therefore, it is possible to reduce the number of parts and the strength of the stand base and the support increases, such that it is possible to keep the display main body stably held.

A display device according to another embodiment of the present disclosure includes: a housing having an opening formed through the front surface; a display main body attached to the housing to close the opening and having a display unit that displays an image; an attachment base attached to a ceiling or a wall; and at least one support connected to the display main body at one end and connected to the attachment base at the other end, in which the support includes a cable inputting/outputting power or signals to/from the display main body and a coating covering the cable.

Therefore, since the cable is disposed in the support, it is possible to improve spatial efficiency, with the display main body stably held.

In the display device described above, the coating is made of a material in which a carbon fiber used as a reinforcing material is contained in resin used as a base material.

Therefore, it is possible to ensure high strength for the support with the thickness decreased, such that it is possible to keep the display main body stably held.

In the display device described above, the coating includes an inner coating covering the cable and an outer coating covering the outer circumferential surface of the inner coating.

Therefore, the coating is provided with a double structure and the selection range of the material of the coating increases, such that it is possible to improve the degree of freedom in design.

In the display device described above, one support is disposed and one end of the support is connected to the center portion in the left-right direction of the display main body.

Therefore, good balance is ensured in the left-right direction in the weight of the display main body, such that it is possible to keep the display main body stably held.

In the display device described above, one end of the support may be connected to the upper surface or the lower surface of the display main body.

The display main body is supported from above or below, it is possible to keep the display main body stably held.

In the display device described above, the thickness of one end of the support increases toward the display main body.

Therefore, strength of the joint where the support is connected to the display main body increases, such that it is possible to keep the display main body stably held.

In the display device described above, the support has the left-right width larger than the front-back width.

Therefore, the front-back and left-right sizes of the support match the front-back and left-right sizes of the thin display main body, particularly, the display main body is prevented from inclining in the left-right direction, such that it is possible to keep the display main body stably held.

In the display device described above, a plurality of supports is disposed.

Therefore, it is possible to distribute and dispose a plurality of cables in the supports, one by one, and accordingly, the thickness of the support can be reduced.

In the display device described above, the housing of the display main body and the coating of the support are integrally formed.

Therefore, it is possible to reduce the number of parts and the connection strength of the support to the display main body increases, such that it is possible to keep the display main body stably held.

In the display device described above the attachment base and the coating of the support are integrally formed.

Therefore, it is possible to reduce the number of parts and the strength of the attachment base and the support increases, such that it is possible to keep the display main body stably held.

DETAILED DESCRIPTION OF EMBODIMENTS

Preferred embodiments for making the present disclosure clear are described hereafter with reference to the accompanying drawings.

The following preferred embodiments are implemented by applying a display device according to an embodiment of the present disclosure to a television receiver. Further, the application of the present disclosure is not limited to a television receiver and the present disclosure may be widely applied to, for example, various display devices having a display main body that displays an image of a personal computer, a screen monitor, or an electrographic camera or the like.

<First Embodiment>

[Configuration of Display Device]

A display device 1 according to a first embodiment is described hereafter.

Figure 1:
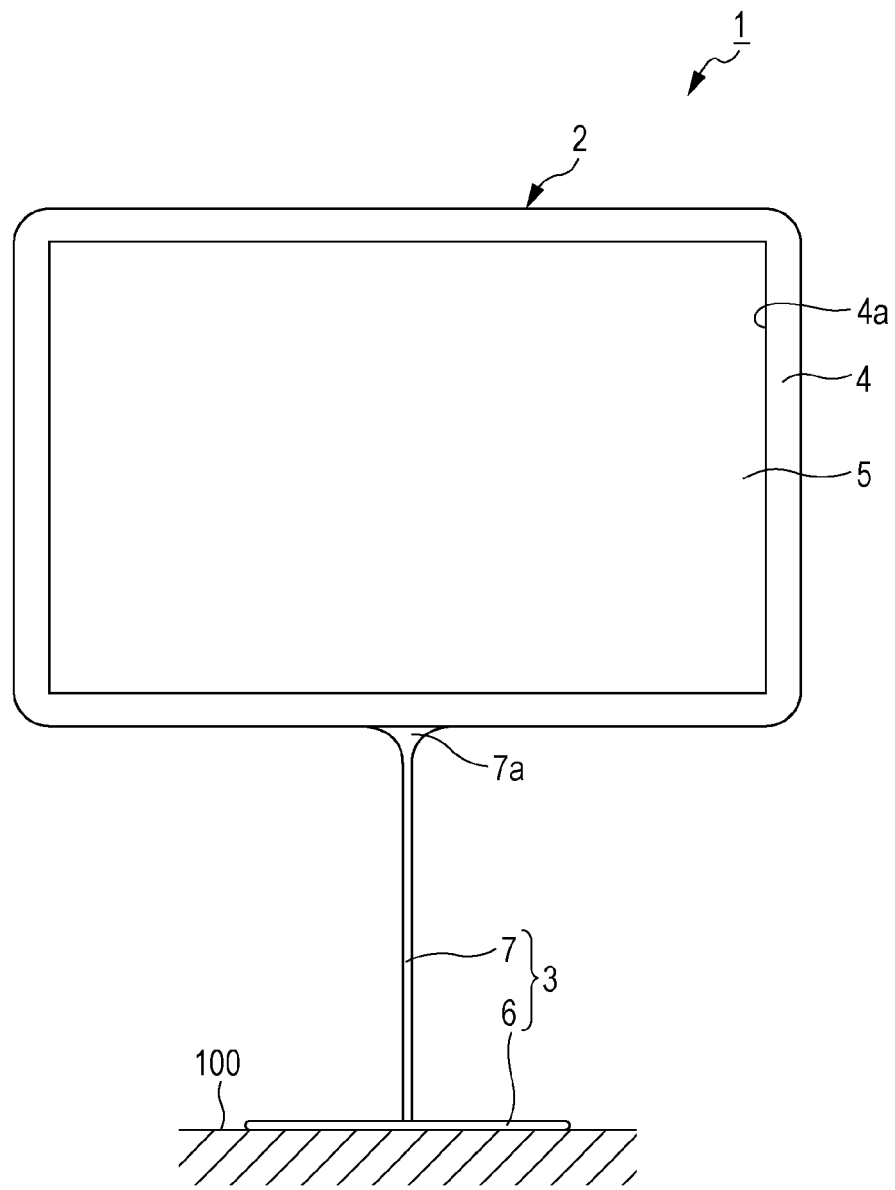
FIG. 1 is a front view of a display device according to a first embodiment of the present disclosure, which shows a preferred embodiment of the present disclosure together with FIGS. 2 to 23.
Figure 2:
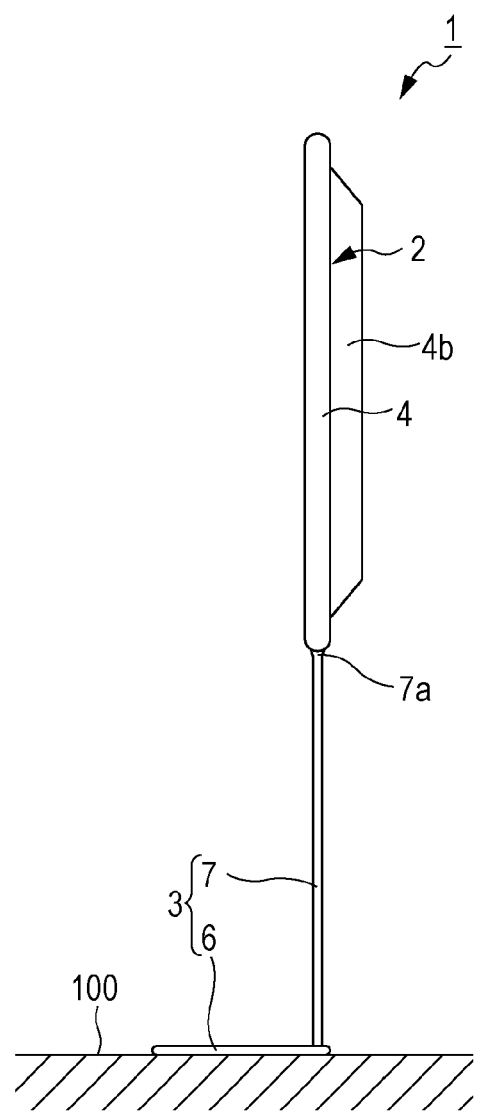
FIG. 2 is a side view of the display device according to the first embodiment.

The display device 1, as shown in FIGS. 1 and 2, includes a display main body 2 that displays an image and a stand 3 that holds the display main body 2 placed on a mounting surface 100, such as a holder or a floor.

The display main body 2, for example, has a housing having a horizontally long flat rectangular shape and a display unit 5 facing the front to display an image.

The housing 4 is formed in a flat box shape with an opening 4a through the front surface. A plurality of circuit boards (not shown) is disposed inside the housing 4. As the circuit boards, various circuit boards, such as a circuit board for image control which activates the display unit 5, a circuit board that supplies power to the parts disposed inside the housing 4, and a circuit board that controls turning on/off of a backlight, are disposed.

The display unit 5 is disposed inside the housing 4 to close the opening 4a of the housing at the front side. For example, a liquid crystal panel or an organic electroluminescence panel is used as the display unit 5.

Figure 3:
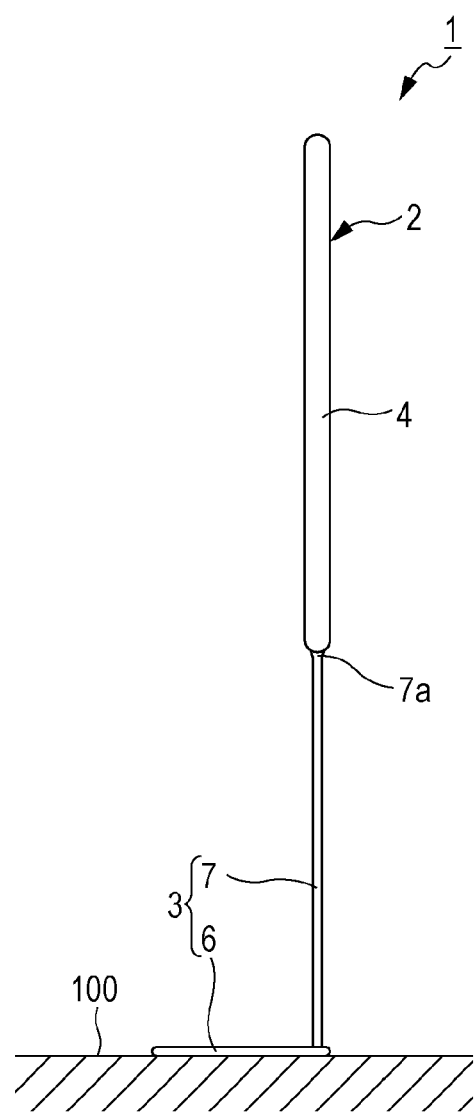
FIG. 3 is a side view showing another example of the display device according to the first embodiment.

As described above, although the plurality of circuit boards is disposed inside the housing 4, the circuit boards may be disposed in a protruding portion 4b formed at the rear surface of the housing 4 (see FIG. 2) or may be disposed at the upper/lower and left/right positions of the display unit 5 inside the housing 4 (see FIG. 3). It is possible to make the display device 1 thinner by disposing the circuit boards at the upper/lower and left/right positions of the display unit 5 inside the housing 4.

Further, the selection of the positions where the circuit boards are disposed, that is, selection of whether to dispose the circuit boards in the protrusion portion 4b or at the upper/lower and left/right positions of the display unit 5 can be applied in the same way as the display device 1, in all of display devices described below.

The stand 3 is composed of a stand base 6 and a support 7.

The stand base 6 is formed in a plate shape in the up-down direction, and for example, made of resin.

The support 7 is formed in a rod shape vertically extending and protrudes vertically from the stand base 6.

Figure 4:
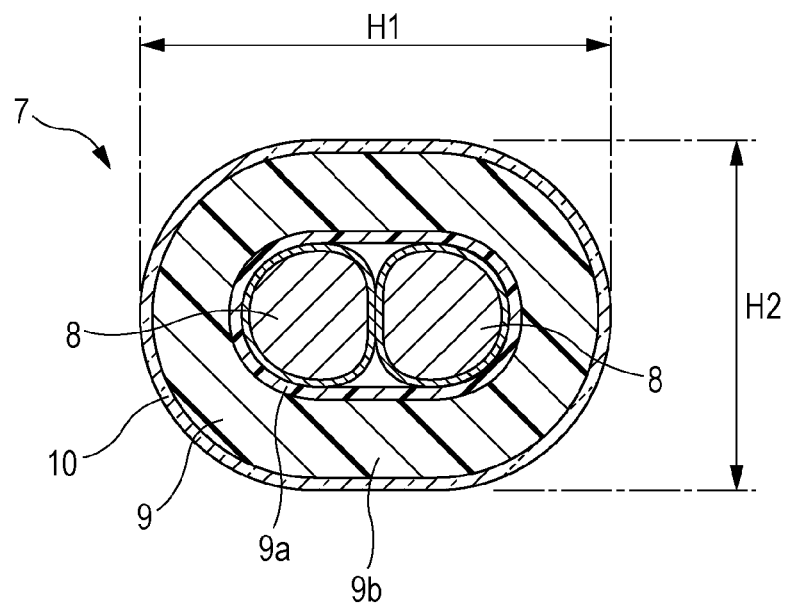
FIG. 4 is an enlarged cross-sectional view of a support.

The support 7, for example, is composed of two cables 8 and 8, a coating 9 covering the outer circumferential surfaces of the cables 8 and 8, and a cover 10 covering the outer side of the coating 9 (see FIG. 4).

The support 7 is coupled at the upper end 7a to the lower end of the display main body 2 and the upper end 7a is formed to be thicker toward the display main body 2 (see FIGS. 1, 2, 3, and 5). The support 7, for example, includes two cables 8 and 8 disposed in parallel at the left and right, and accordingly, the left-right width H1 is larger than the front-back width H2 (see FIG. 4).

The cables 8 and 8 function as power cables for supplying power to the circuit boards disposed in the display main body 2 or signal cables for inputting/outputting signals for the parts of the circuit board. Further, the number of the cables 8 is not limited to two, and a certain number for supplying power and inputting/outputting signals may be possible or only one cable 8 may be disposed to supply power when signals are wirelessly input/output to/from the display main body 2.

Figure 5:
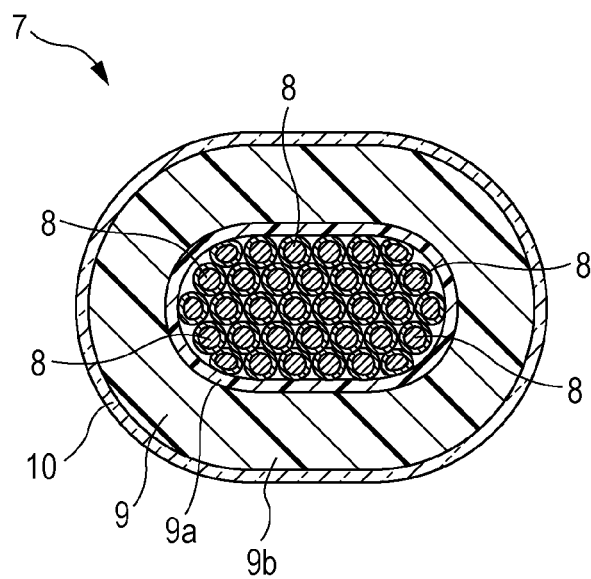
FIG. 5 is an enlarged cross-sectional view of another example of the support.
Figure 6:
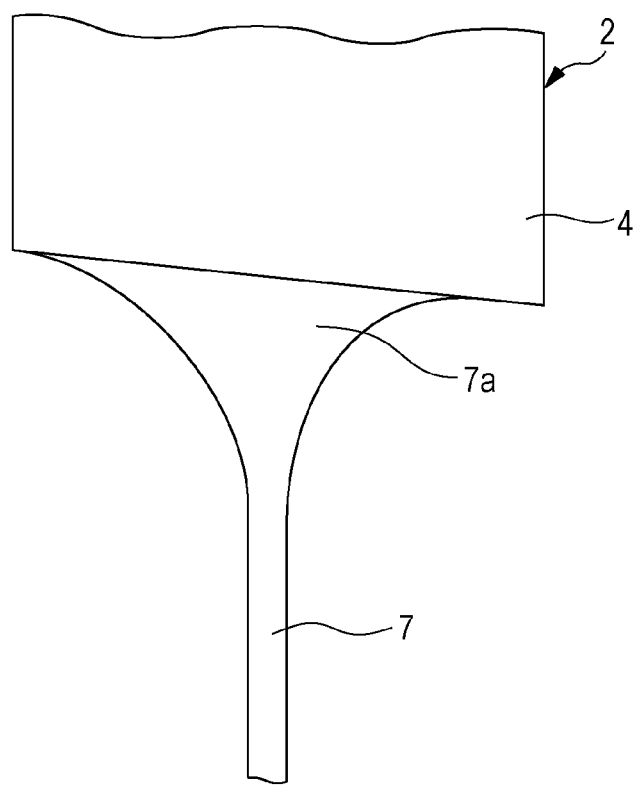
FIG. 6 is an enlarged side view showing the joint of the display main body and the support.

For example, as shown in FIG. 5, it may be possible to dispose a plurality of cables 8, 8, . . . . When about twenty cables 8, 8, . . . are disposed, for example, they are used for power or signals of an HDMI (High-Definition Multimedia Interface), and when about two hundreds cables 8, 8, . . . are disposed, for example, they are used for power or parallel signals of LVDS (Low-Voltage Differential Signaling).

The cables 8 and 8 are led outside through the stand base 6 or connected to a connector (not shown) disposed at the stand base 6.

The coating 9 is composed of an inner coating 9a covers the cables 8 and 8 and an outer coating 9b covers the inner coating 9a of the outer circumferential surface.

The outer coating 9b of the support 7 and the stand base 6 are, for example, integrally formed.

The inner coating 9a is small in thickness and, for example, made of a resin material.

CFRP (Carbon Fiber Reinforced Plastics) in which a carbon fiber that is a reinforcing material is contained in a resin material that is a base material is used for the outer coating 9b. The CFRP is reinforced synthetic resin containing carbon fiber. An epoxy-based resin material that is, for example, thermosetting resin is used as the base material and, for example, an UD (unidirectional) material that is aligned only in one direction is used as the carbon fiber that is a reinforcing material.

Further, although it is exemplified in the above that the outer coating 9b is formed by an epoxy-based resin material that is the base material and a carbon fiber that is the reinforcing material, the base material and the reinforcing material of the outer coating 9b are not limited to the epoxy-based resin material and the carbon fiber.

It is possible to use a thermoplastic resin material, such that polyamide, polycarbonate, polyether, polyimide, or poly ether ether ketone.

Further, it is possible to use various fiber materials, such as a glass fiber, an aramid fiber, a tum fiber, or a kepler fiber.

The cover 10 is made of, for example, a thin glass material.

The upper end 7a of the support 7 is connected to the housing 4 of the display main body 2. The position where the upper end 7a of the support 7 is connected to the housing is, for example, the center portion in the left-right direction of the lower surface of the housing 4.

As the upper end 7a of the support 7 is connected to the lower surface of the housing 4, the display main body 2 is supported from below, such that it is possible to keep the display main body 2 stably held.

Further, as the support 7 is connected to the center portion in the left-right direction of the housing 4, the left-right balance of the display main body 2 is favorably kept, such that it is possible to keep the display main body 2 stably held.

Figure 7:
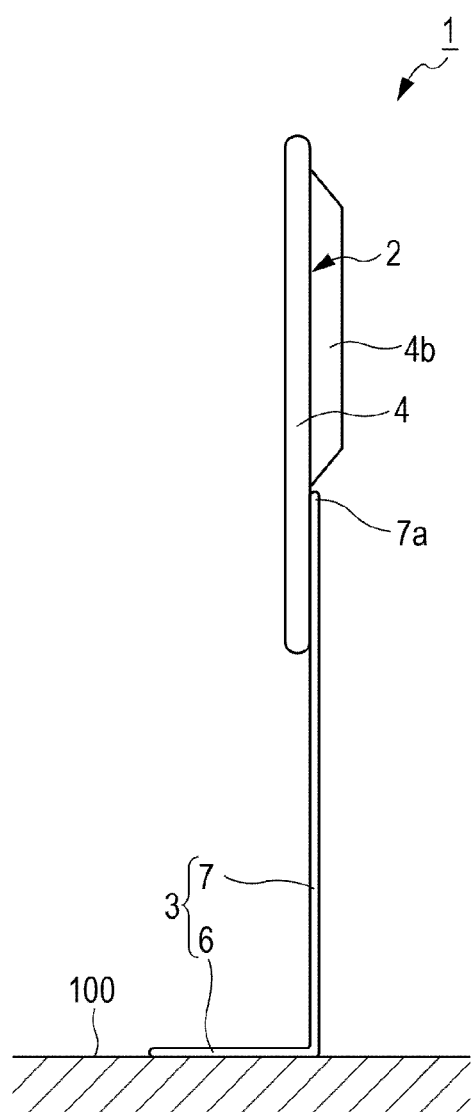
FIG. 7 is a side view of a display device which shows an example in which the support is coupled to the rear surface of the display main body.

Further, the position where the upper end 7a of the support 7 is connected to the housing 4 may be on the rear surface of the housing 4, as shown in FIG. 7, and when the upper end 7a of the support 7 is connected to the rear surface of the housing 4, the connection position is preferably the center portion in the left-right direction of the rear surface.

Further, since the support 7 is formed such that the thickness increases as the upper end 7a becomes closer to the display main body 2, the strength of the portion connected with the display main body 2 in the support 7 is large and the display main body 2 can be stably held.

Further, since the left-right width H1 is larger than the front-back width H2 in the support 7, the front-back and left-right sizes of the support 7 are the same as the front-back and left-right sizes of the display main body 2, and particularly, the display main body 2 is prevented from inclining in the left-right direction, such that the display main body 2 can be kept stably held.

As described above, since the stand base 6 and the outer coating 9b of the support 7 in the stand 3 are integrally formed, it is possible to reduce the number of parts and keep the display main body 2 stably held, with high strength of the stand 3.

Further, in the display device 1, it is possible to integrally form the outer coating 9b of the support 7 and the housing 4 of the display main body 2. As the outer coating 9b of the support 7 and the housing 4 of the display main body 2 are integrally formed, the connection strength of the support 7 to the display main body 2 is increased, such that it is possible to reduce the number of parts and keep the display main body 2 stably held.

As described above, since the outer coating 9b is made of a resin material containing the reinforcing material, it is possible to ensure high strength for the support 7, and thus, it is possible to reduce the size. For example, when the display main body 2 weighs about 12 kg, the support 7 can sufficiently and stably hold the display main body 2, even if the size of the support 7 is around 10 mm.

[Strength of Support]

The result of analyzing the strength of the support 7 is described hereafter. The analysis of strength of the support 7 was performed on two terms, analysis of buckling and analysis of displacement (in the front-back direction).

Figure 8:
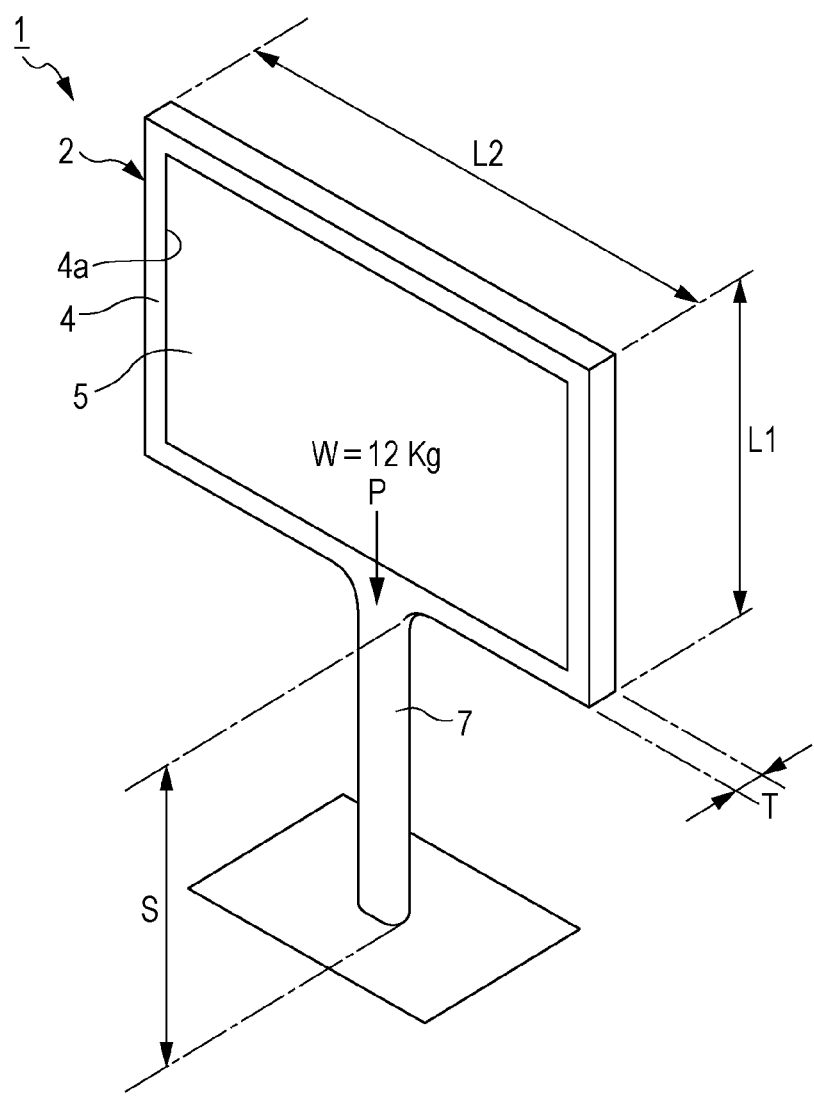
FIG. 8 is a perspective view showing dimensions for analysis of the display device.

The result of the analysis of buckling is described first (see FIG. 8).

In the analysis of buckling, a display main body 2 having a weight W of 12 kg, a longitudinal width L1 of 600 mm, a transverse width L2 of 990 mm, and a thickness T of 12 mm and CFRP having Young's modulus E of 400 GPa was used as the outer coating 9b of the support 7. In the outer coating 9b of the support 7, the left-right width H1 is 12 mm, the front-back width H2 is 9 mm, and the thickness t is 2.5 mm for the whole circumference. The lower end of the support 7 is fixed.

The weight W of the display main body 2 at load of 117.68 N (=12 kgf) is applied to the support 7.

Buckling loads were measured while changing the length S of the support 7 to 300 mm, 600 mm, and 900 mm. The buckling load was 2402.4 N at the length S of 300 mm, 746.0 N at the length S of 600 mm, and 362.4 N at the length S of 900 mm. Therefore, the safety factor was 20.41, 6.34, and 3.08 at the lengths S of 300 mm, 600 mm, and 900 mm, respectively.

From the result described above, it was possible to achieve an analysis result that sufficient strength of the support 7 against buckling is ensured and it is possible to stably hold the display main body 2 without buckling by using the support 7.

Figure 9:
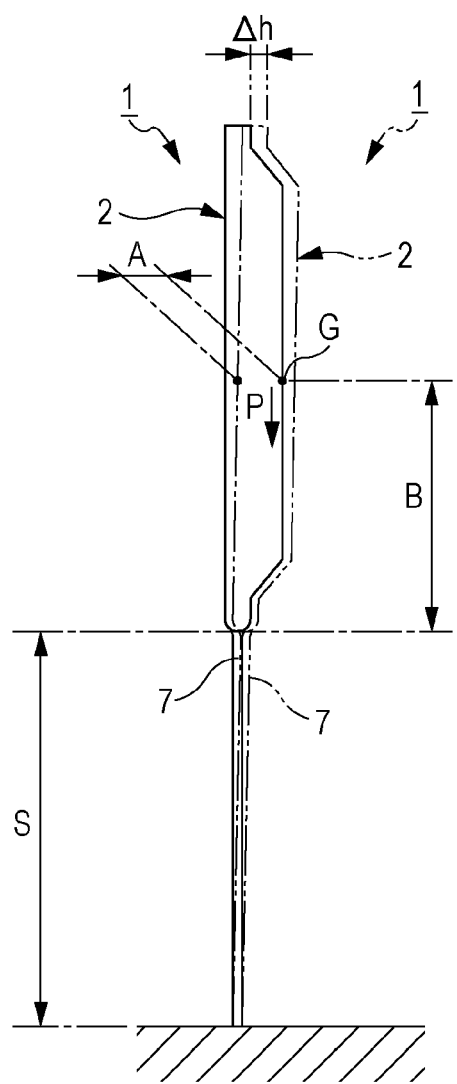
FIG. 9 is a side view showing dimensions for analysis of the display device.

The analysis of displacement is described next (see FIG. 9).

In the analysis of displacement, the same as the analysis of buckling, a display main body 2 having a weight W of 12 kg, a longitudinal width L1 of 600 mm, a transverse width L2 of 990 mm, and a thickness T of 12 mm and CFRP having Young's modulus E of 400 GPa was used as the outer coating 9b of the support 7. In the outer coating 9b of the support 7, the same as the analysis of buckling, the left-right width H1 is 12 mm, the front-back width H2 is 9 mm, and the thickness t is 2.5 mm for the whole circumference. The lower end of the support 7 is fixed.

The center position was set to a virtual center position G displaced at 20 mm (distance A) back from the vertical axis of the support 7. The virtual center position G is the position at a distance S of 250 mm from the left-right center of the display main body 2, that is, upward from the lower end of the display main body 2. Therefore, the weight W of the display main body 2 at load of 117.68 N (=12 kgf) is applied to the virtual center position G.

The maximum displacement Δh of the upper end of the display main body 2 and the maximum stress σ of the support 7 were measured when the length S of the support 7 is the maximum, 900 mm. The maximum displacement Δh of the upper end of the display main body 2 was 8.39 mm when the length S was 900 mm and the maximum stress σ of the support 7 was 24.2 MPa when the length S was 900 mm. The maximum stress σ was measured at a position close to the upper end, that is, at the lower end of the upper end 7a formed to be thicker toward the display main body 2.

From the result described above, it was possible to achieve an analysis result that sufficient strength of the support 7 against the front-back displacement is ensured and it is possible to stably hold the display main body 2 without excessive displacement by using the support 7.

[Method of Forming Support]

A method of forming the support 7 is formed hereafter.

The support 7 is formed, for example, by an autoclave method.

The autoclave method is a method of stacking prepregs that are product molded in sheet shapes in which resin materials that is a base material is impregnated in a reinforcing material, such as a carbon fiber, which is aligned in one direction into a mold, sealing the stacked prepregs with a bagfilm, and then performing thermal-curing under pressure with the inside of the bagfilm made in a vacuum state by a vacuum pump.

According to the autoclave method, general versatility of the resin material that is used is high, developmental rate of voids (air gaps) is low, and a desired shape can be achieved with high accuracy.

Further, the support 7 may be formed by a tape wrapping method.

The tape wrapping method is a method of winding a prepreg on a core member having a round shaft shape, which is called a mandrel, further winding a heat-shrinkable tape on the wound prepreg, and pressing the prepreg by performing thermal curing in a hardening furnace such that the heat-shrinkable tape contracts.

According to the tape wrapping method, the molding accuracy of the inner circumference surface of a molded product is particularly high and a desired shape can be achieved with high accuracy.

Further, the support 7 may be formed by a filament winding method.

The filament winding method is a method of winding a prepreg on a mandrel by rotating the mandrel, further winding a heat-shrinkable tape on the wound prepreg, and pressing the prepreg by performing thermal curing in a hardening furnace such that the heat-shrinkable tape contracts.

According to the filament winding method, the molding accuracy of the inner circumference surface of a molded product is particularly high and a desired shape can be achieved with high accuracy.

Further, the support 7 may be formed by a pultrusion method.

The pultrusion method is a method of impregnating a resin material into a carbon fiber by running a reinforcing material, such as a carbon fiber aligned in one direction, in a tub filled with molten resin that is a base material, and then extruding and pressing a molded produce with resin impregnated.

According to the pultrusion method, it is possible to ensure high properties of the molded product by continuous molding.

[Modified Example of Display Device]

Modified examples of the display device 1 are described below (see FIGS. 10 to 18).

Further, the display devices according to the modified example described below are different only in the shape or number of the support in comparison to the display device 1 described above, such that only the portions different from the display device 1 in the display devices according to the modified example are described in detail. Therefore, the components of the display devices according to the modified examples, which are the same as those of the display device 1, are given the same reference numerals as those of the display device 1.

Figure 10:
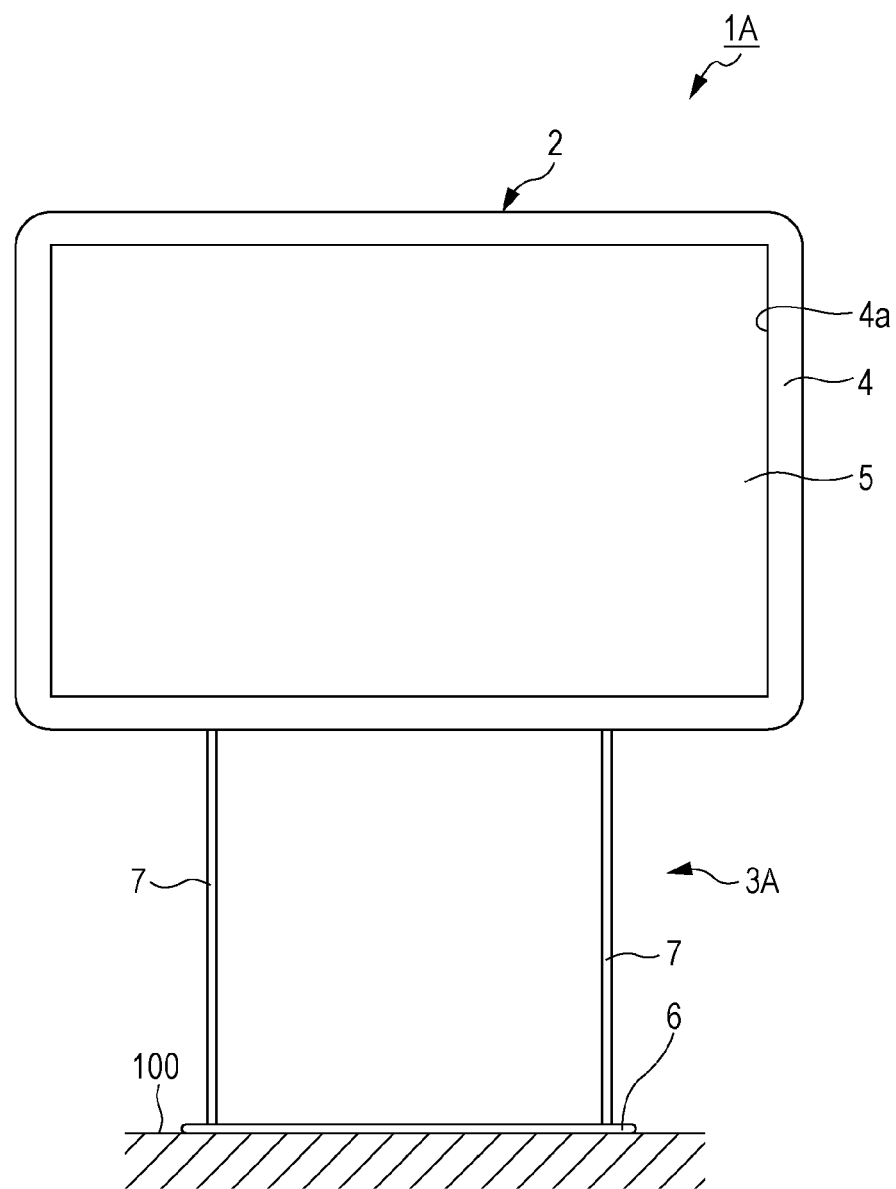
FIG. 10 is a front view of a display device according to a first modified example of the present disclosure, which shows a modified example of the present disclosure together with FIGS. 11 to 18.

A display device 1A according to a first modified example includes a display main body 2 and a stand 3A holding the display main body 2 (see FIG. 10).

The stand 3A is composed of a stand base 6 and supports 7 and 7. The supports 7 and 7 are formed in bar shapes vertically extending, disposed at the left and right sides with a gap, and protrude upward from the left and right ends of the stand base 6, respectively.

Further, although two supports 7 and 7 are exemplified, the number of the supports 7 is arbitrarily determined and three or more supports 7, 7, . . . may be disposed in parallel at the left and right sides.

Figure 11:
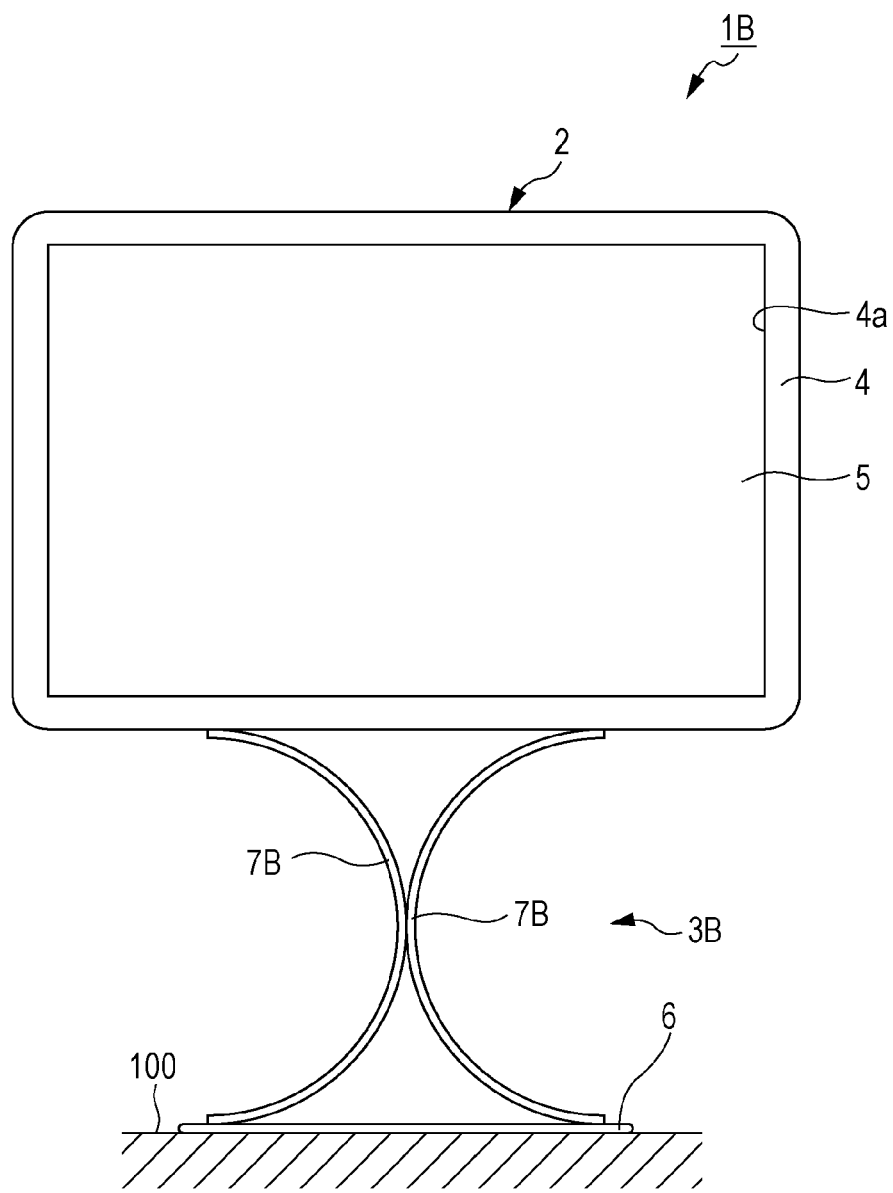
FIG. 11 is a front view of a display device according to a second modified example.

A display device 1B according to a second modified example includes a display main body 2 and a stand 3B holding the display main body 2 (see FIG. 11).

The stand 3B is composed of a stand base 6 and supports 7B and 7B. The supports 7B and 7B are formed in semi-arc shapes, disposed with the axial center portions connected, and protrude from the left and right ends of the stand base 6.

Further, although two supports 7B and 7B are exemplified, the number of the supports 7B is arbitrarily determined and three or more supports 7B, 7B, . . . may be disposed in parallel at the left and right sides.

Figure 12:
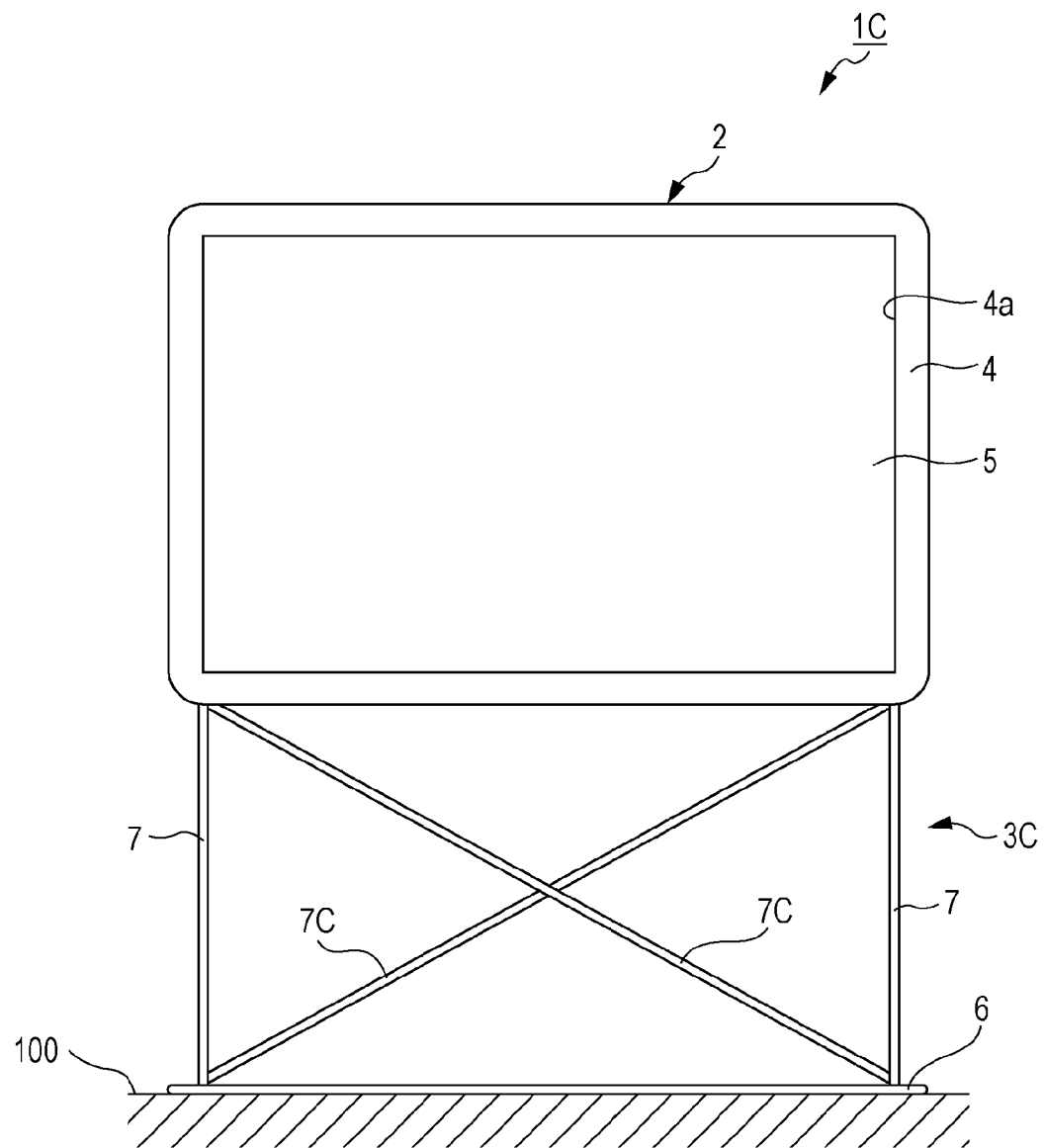
FIG. 12 is a front view of a display device according to a third modified example.

A display device 1C according to a third modified example includes a display main body 2 and a stand 3C holding the display main body 2 (see FIG. 12).

The stand 3C is composed of a stand base 6, supports 7 and 7, and supports 7C and 7C. The supports 7 and 7 are disposed at the left and right with a gap and protrude upward from the left and right ends of the stand base 6. The supports 7C and 7C are disposed to cross each other at an angle and the upper and lower ends are connected to the upper and lower ends of the supports 7 and 7, respectively.

Figure 13:
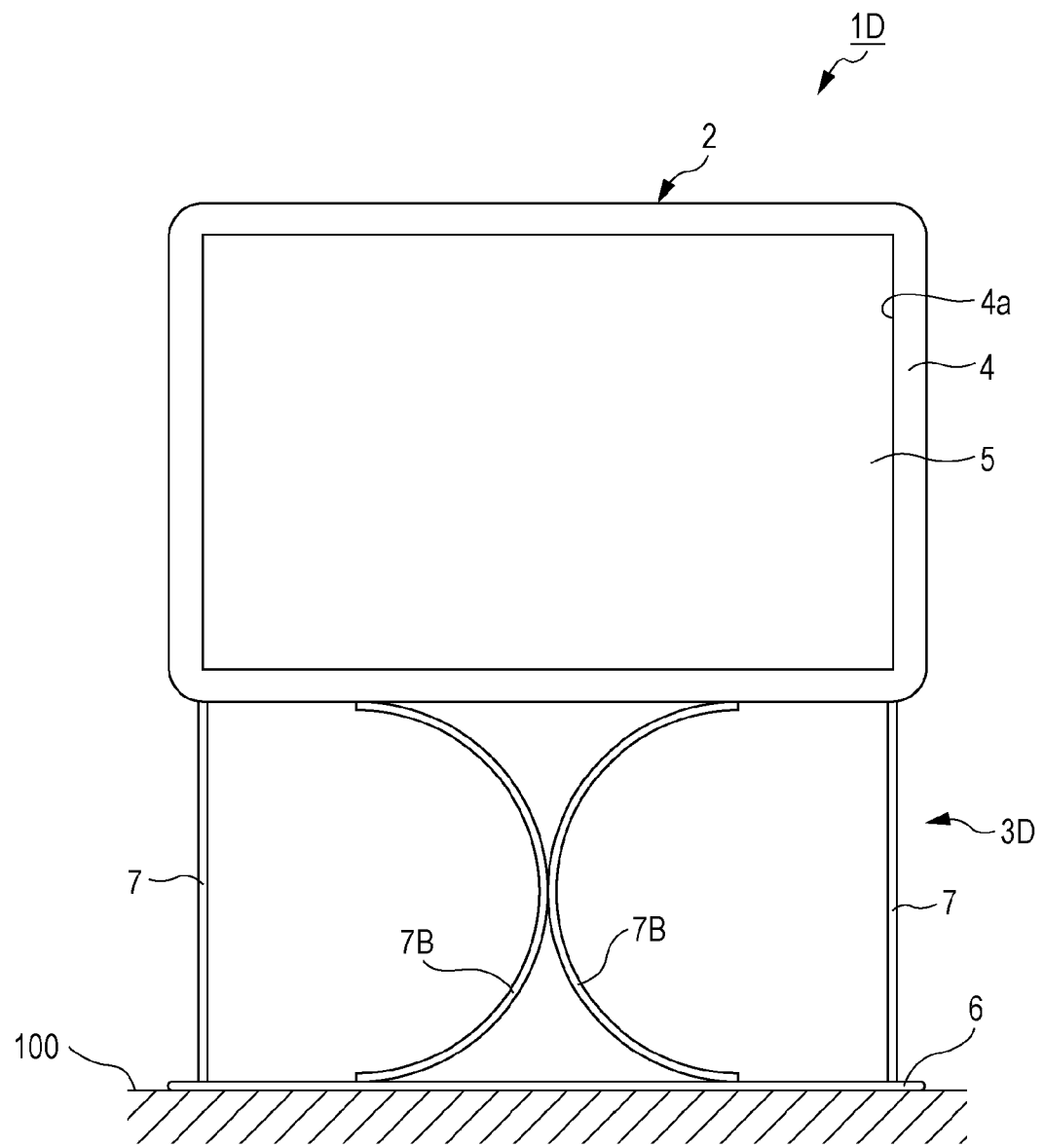
FIG. 13 is a front view of a display device according to a fourth modified example.

A display device 1D according to a fourth modified example includes a display main body 2 and a stand 3D holding the display main body 2 (see FIG. 13).

The stand 3D is composed of a stand base 6, supports 7 and 7, and supports 7B and 7B. The supports 7 and 7 are formed in bar shapes vertically extending, disposed at the left and right sides with a gap, and protrude upward from the left and right ends of the stand base 6, respectively. The supports 7B and 7B are formed in semi-arc shapes, disposed with the axial center portions connected, and positioned between the supports 7 and 7.

Further, although two supports 7 and 7 and two supports 7B and 7B are exemplified, the number of the supports 7 and 7B is arbitrarily determined and three or more supports 7, 7, . . . and 7B, 7B, . . . may be disposed in parallel at the left and right sides.

Figure 14:
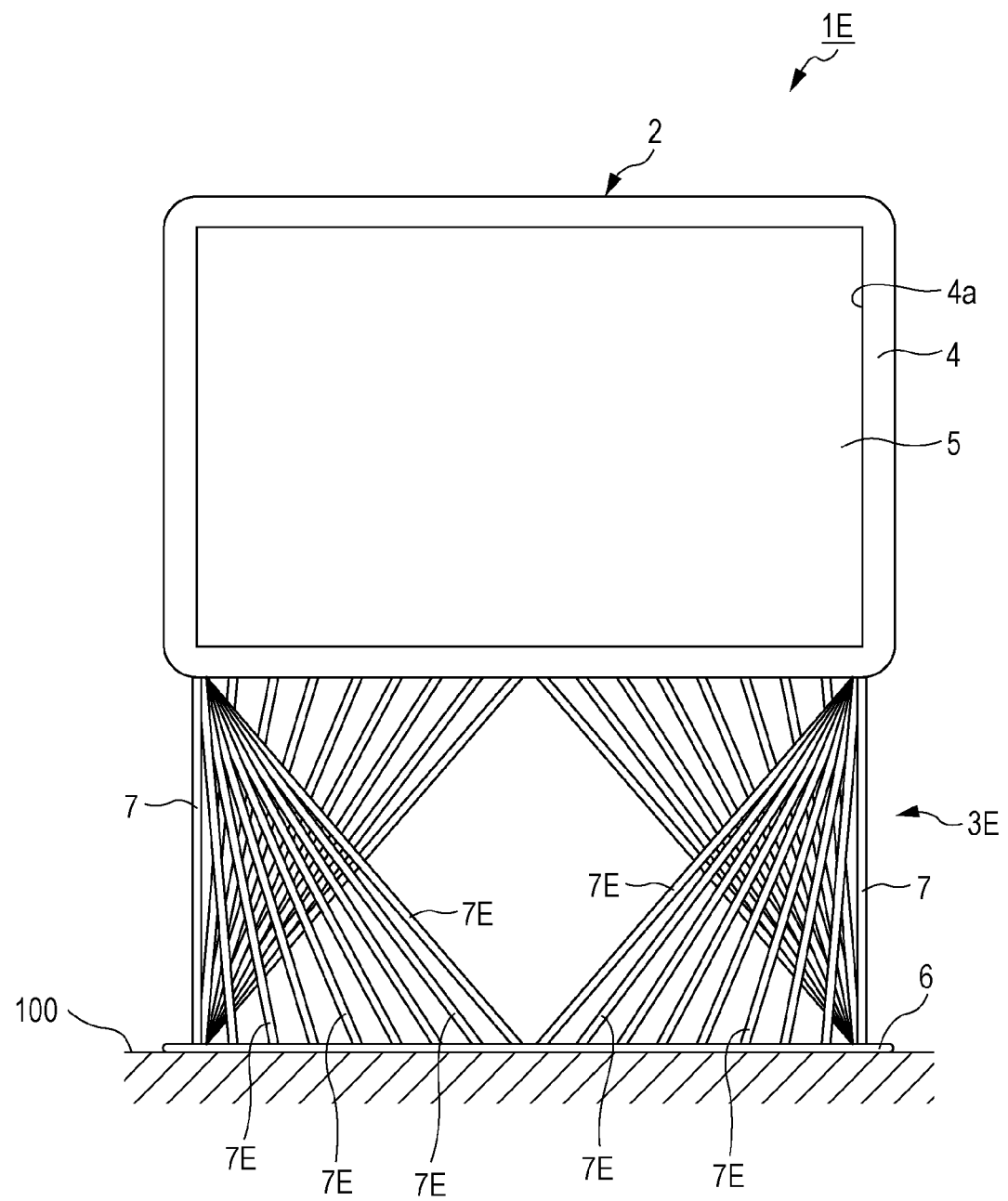
FIG. 14 is a front view of a display device according to a fifth modified example.

A display device 1E according to a fifth modified example includes a display main body 2 and a stand 3E holding the display main body 2 (see FIG. 14).

The stand 3E is composed of a stand base 6, supports 7 and 7, and supports 7E, 7E, . . . . The supports 7 and 7 are formed in bar shapes vertically extending, disposed at the left and right sides with a gap, and protrude upward from the left and right ends of the stand base 6, respectively. The supports 7E, 7E, . . . are disposed at various angles in a vertical plane, with the upper ends connected to the lower end of the display main body 2 or the upper ends of the supports 7 and 7 and the lower ends connected to the stand base 6 or the lower ends of the supports 7 and 7. The portions connected to the lower end of the display main body 2 in the supports 7E, 7E, . . . are positioned with a gap at the left and right and the portions connected to the stand base 6 in the supports 7E, 7E, . . . are positioned with a gap at the left and right.

Figure 15:
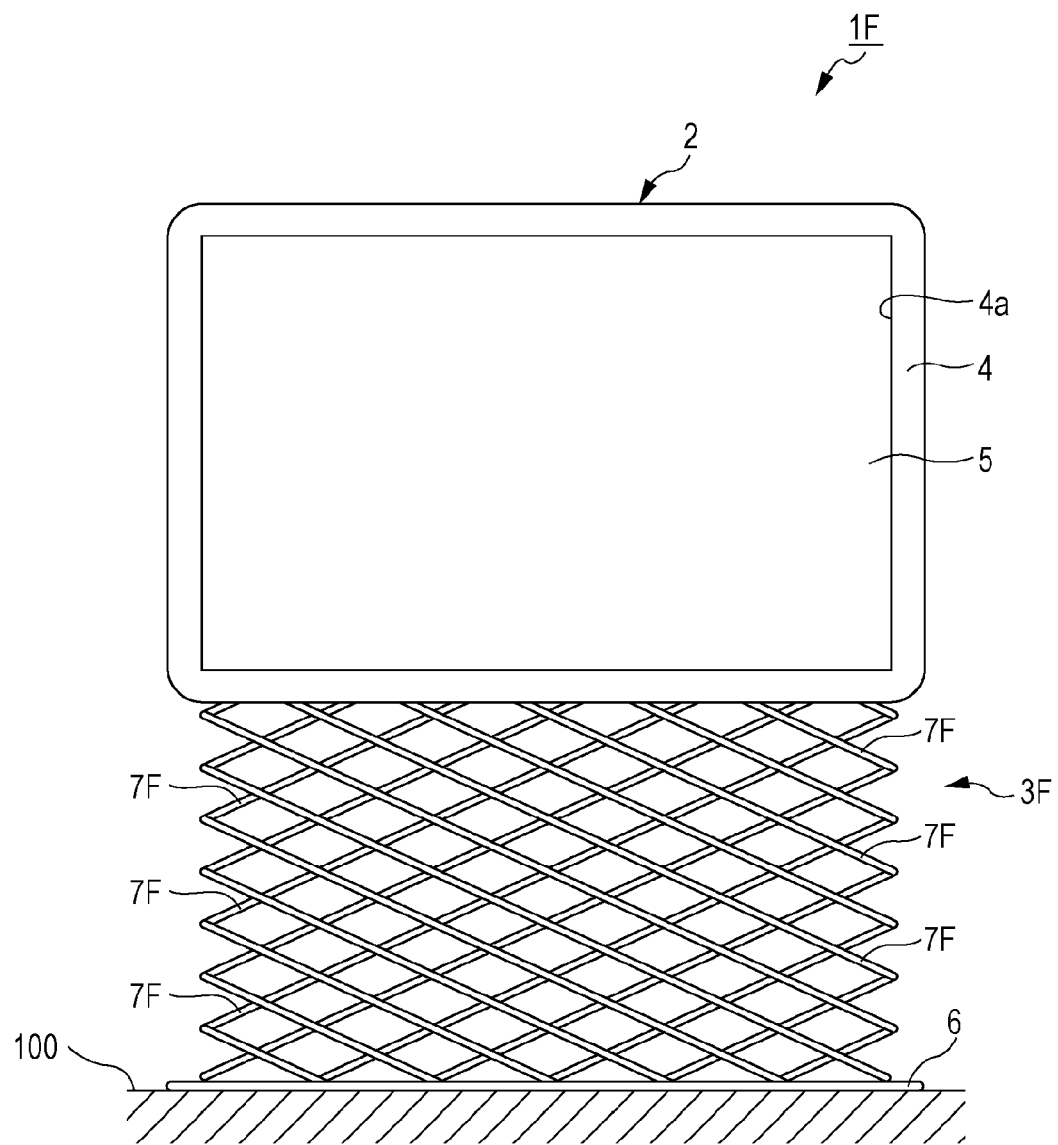
FIG. 15 is a front view of a display device according to a sixth modified example.

A display device 1F according to a sixth modified example includes a display main body 2 and a stand 3F holding the display main body 2 (see FIG. 15).

The stand 3F is composed of a stand base 6 and supports 7F, 7F, . . . . The supports 7F, 7F, . . . are disposed at the same angle in a vertical plane, entirely in a uniform mesh shape.

Figure 16:
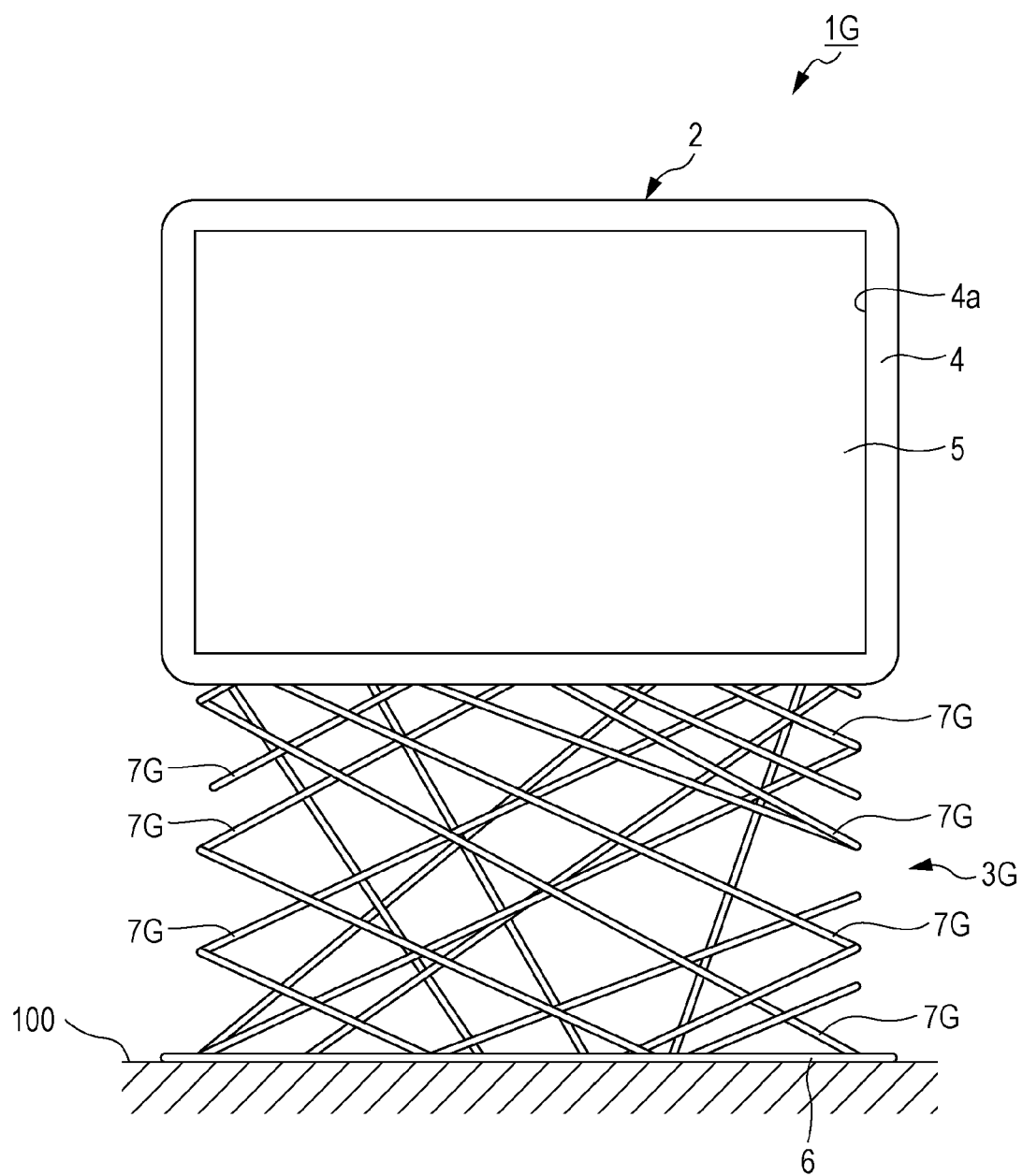
FIG. 16 is a front view of a display device according to a seventh modified example.

A display device 1G according to a seventh modified example includes a display main body 2 and a stand 3G holding the display main body 2 (see FIG. 16).

The stand 3G is composed of a stand base 6 and supports 7G, 7G, . . . . The supports 7G, 7G, . . . are disposed at various angles in a vertical plane, entirely in a non-uniform mesh shape.

Figure 17:
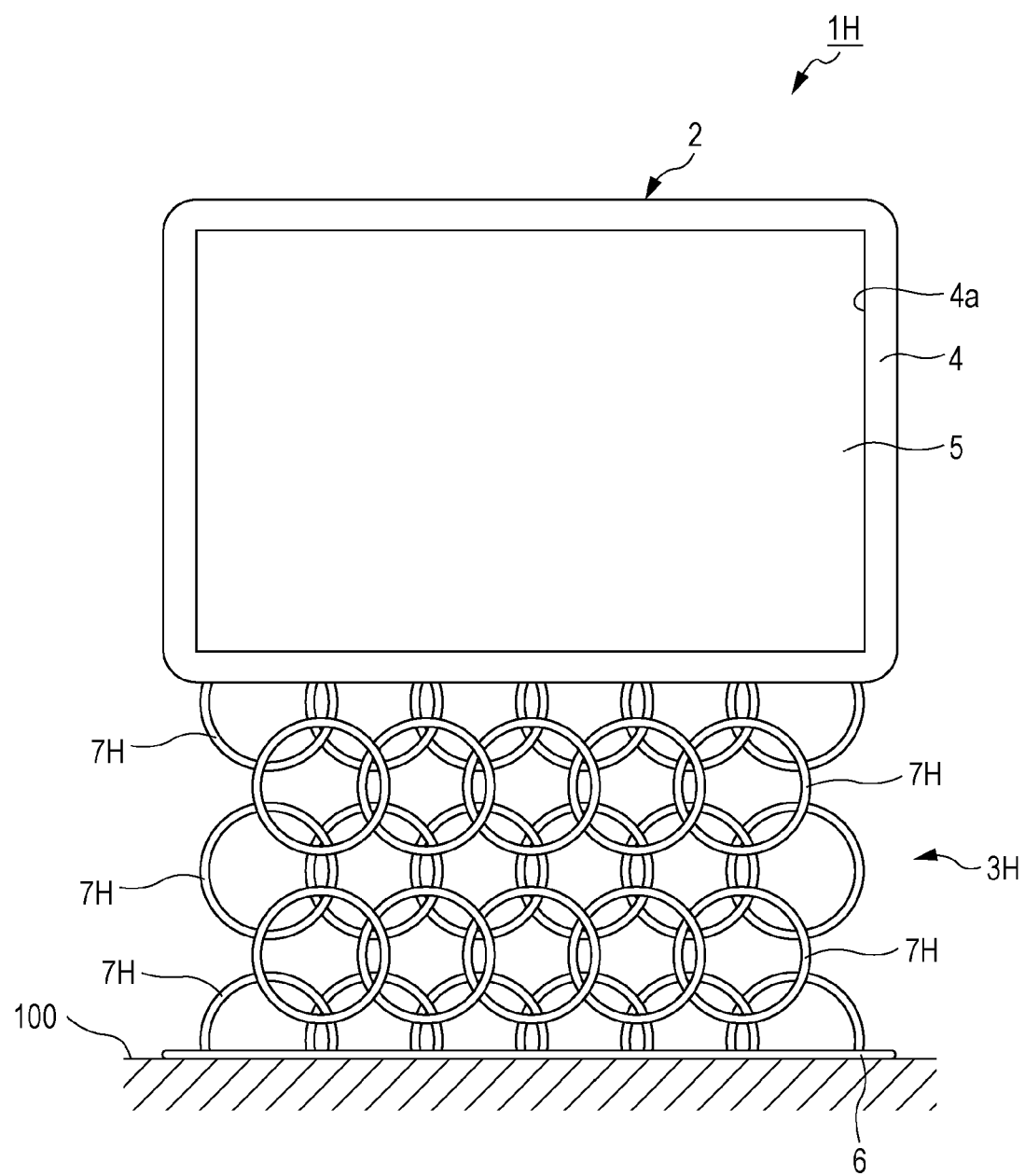
FIG. 17 is a front view of a display device according to an eighth modified example.

A display device 1H according to an eighth modified example includes a display main body 2 and a stand 3H holding the display main body 2 (see FIG. 17).

The stand 3H is composed of a stand base 6 and supports 7H, 7H, . . . . The supports 7H, 7H, . . . are formed in circular shapes having the same size, and regularly arranged and connected.

Further, it is exemplified when the supports 7H, 7H, . . . are uniformly arranged, the supports 7H, 7H, . . . may be non-uniformly arranged and connected.

Figure 18:
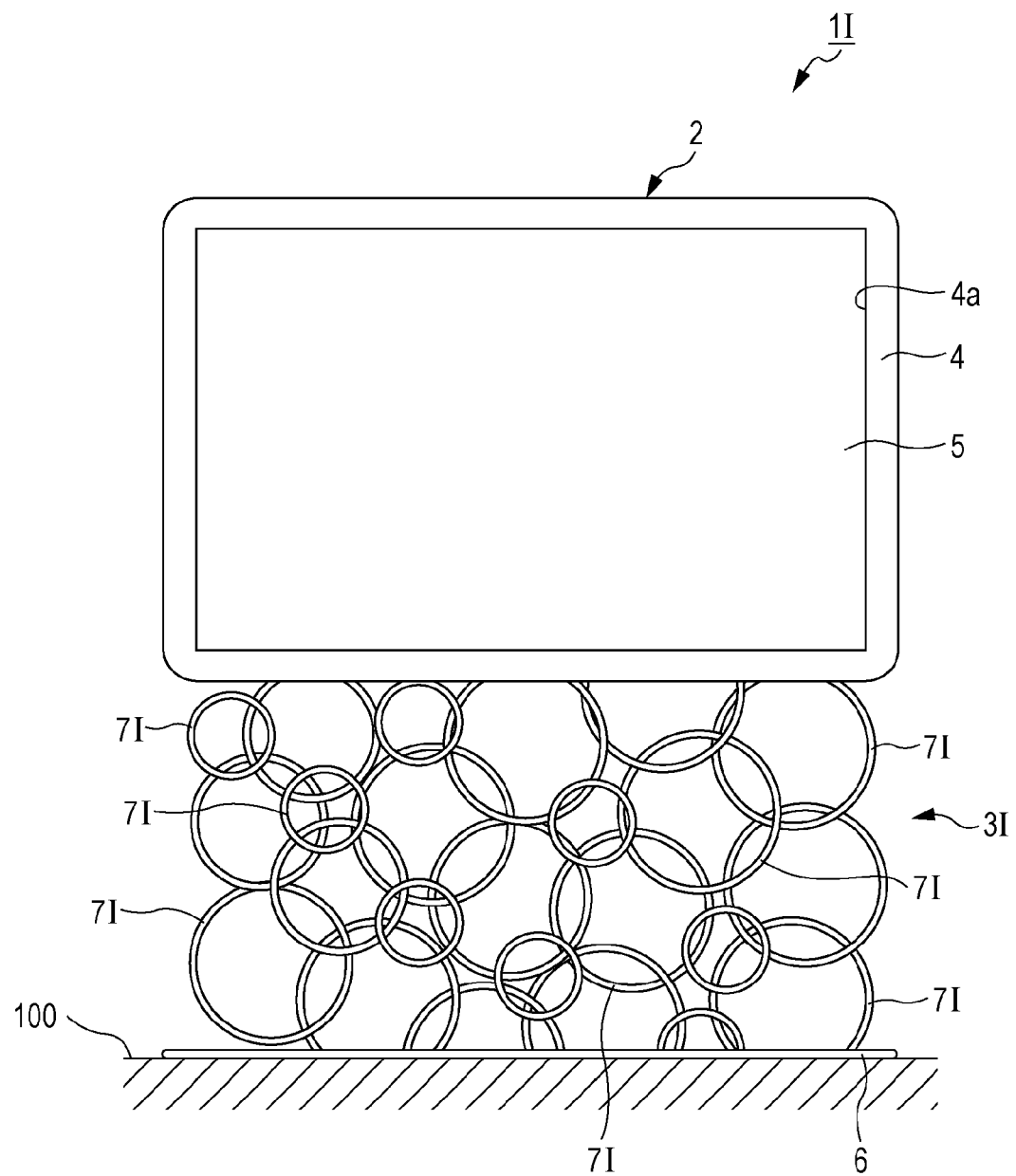
FIG. 18 is a front view of a display device according to a ninth modified example.

A display device 1I according to a ninth modified example includes a display main body 2 and a stand 3I holding the display main body 2 (see FIG. 18).

The stand 3I is composed of a stand base 6 and supports 7I, 7I, . . . . The supports 7I, 7I, . . . are formed in circular shapes having the same size, and regularly arranged and connected.

Further, it is exemplified when the supports 7I, 7I, . . . are uniformly arranged, the supports 7I, 7I, . . . may be non-uniformly arranged and connected.

The plurality of supports, 7, 7B, . . . are disposed in the display devices 1A, 1B, 1C, 1D, 1E, 1F, 1G, 1H, and 1I according to the modified examples described above.

Accordingly, it is possible to set the shapes, sizes, and arrangements of the plurality of supports 7, 7B, in consideration of strength for holding the display main body 2 and it is possible to improve the degree of freedom in design.

Further, in the display devices 1A, 1B, 1C, 1D, 1E, 1F, 1G, 1H, and 1I according to the modified examples, since the plurality of supports 7, 7B, . . . are disposed, it is possible to distribute and dispose one of a plurality of cables 8, 8, . . . in the supports 7, 7B, . . . , respectively, such that it is possible to reduce the sizes of the supports 7, 7B, . . . . Further, the strength of the supports 7, 7B, . . . of the display devices 1X is the same as the strength of the support 7 of the display device 1.

<Second Embodiment>

Figure 19:
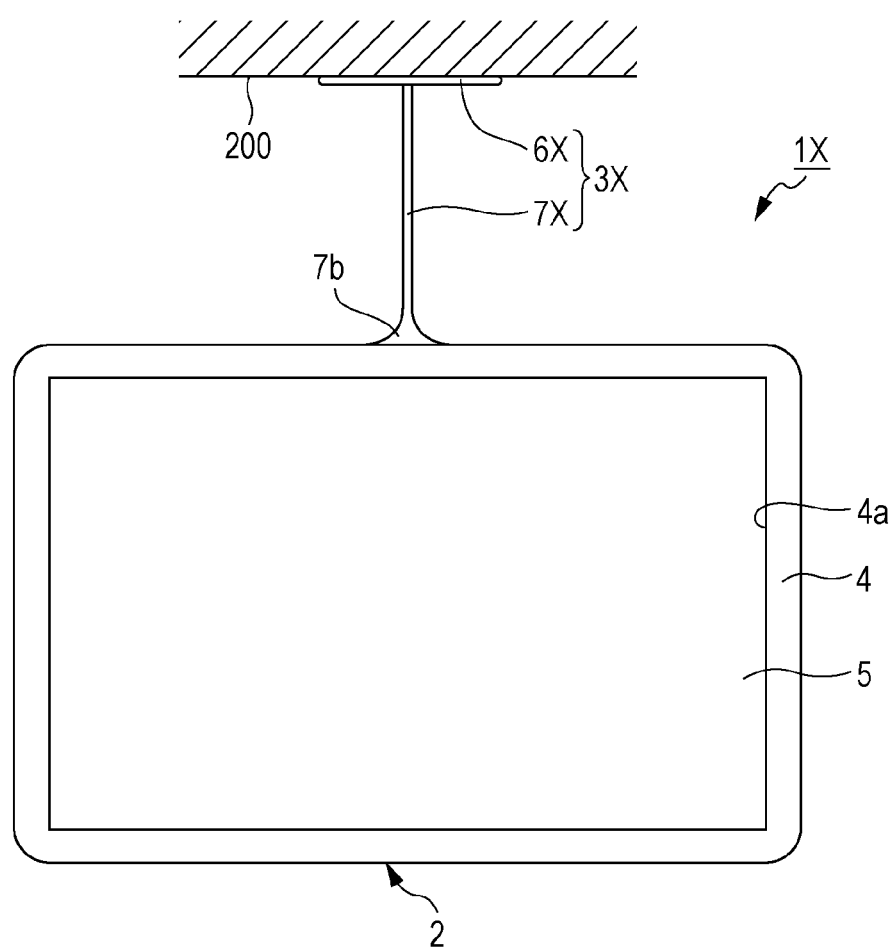
FIG. 19 is a front view showing a display device according to a second embodiment together with FIG. 20.
Figure 20:
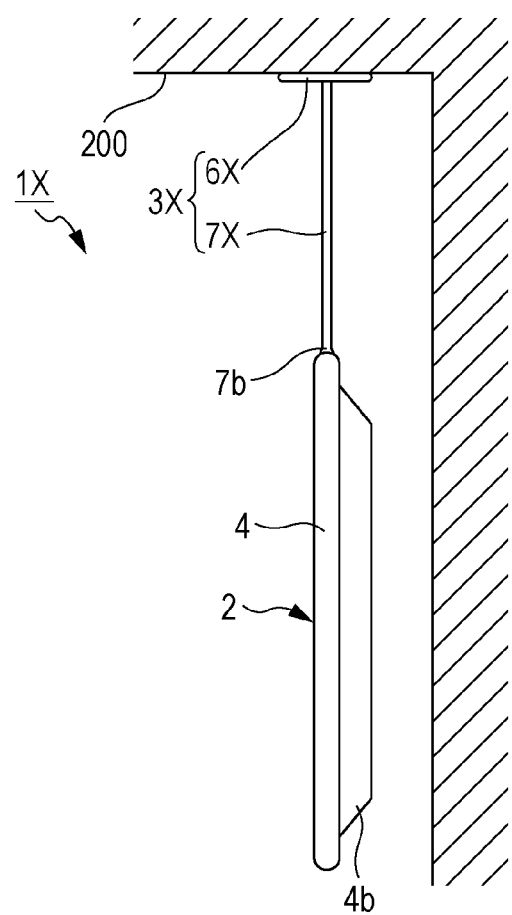
FIG. 20 is a side view.

A display device 1X according to a second embodiment is described next (see FIGS. 19 and 20).

Further, the display device 1X according to the second embodiment is different in the type in which it is suspended from a ceiling, as compared with the display device 1 according to the first embodiment described above, such that only the different portions from the display device 1 in the display device 1X according to the second embodiment are described. Therefore, the components of the display device 1X, which are the same as those of the display device 1, are given the same reference numerals as those of the display device 1.

The display device 1X includes a display main body 2 that displays an image and a stand 3X attached to a ceiling 200 and holding the display main body 2.

The stand 3X is composed of an attachment base 6X and a support 7X.

The attachment base 6X is formed in a plate shape in the up-down direction, and for example, made of resin.

The support 7X is formed in a bar shape vertically extending, and for example, protrudes downward from the rear end of the attachment base 6X. The support 7X, for example, is composed of two cables 8 and 8, a coating 9 covering the outer circumferential surfaces of the cables 8 and 8, and a cover 10 covering the outer side of the coating 9.

The support 7X is formed, for example, integrally with an outer coating 9b of the attachment base 6.

Further, the number of cables 8 is not limited to two, and a certain number for supplying power and inputting/outputting signals may be possible or only one cable 8 may be disposed to supply power when signals are wirelessly input/output to/from the display main body 2.

The support 7X is connected, at the lower end 7b, to the upper end of the display main body 2 and the lower end 7b is formed to become thicker toward the display main body 2. The support 7X, for example, includes two cables 8 and 8 disposed in parallel at the left and right, and accordingly, the left-right width is larger than the front-back width.

The lower end 7b of the support 7X is connected to the housing 4 of the display main body 2. The position where the lower end 7b of the support 7X is connected to the housing is, for example, the center portion in the left-right direction of the upper surface of the housing 4.

As the lower end 7b of the support 7X is connected to the upper surface of the housing 4, the display main body 2 is supported from above, such that it is possible to keep the display main body 2 stably held.

Further, as the support 7X is connected to the center portion in the left-right direction of the housing 4 of the display main body 2, the left-right balance of the display main body 2 is favorably kept, such that it is possible to keep the display main body 2 stably held.

Further, the position where the lower end 7b of the support 7X is connected to the housing 4 may be on the rear surface of the housing 4, and when the lower end 7b of the support 7X is connected to the rear surface of the housing 4, the connection position is preferably the center portion in the left-right direction of the rear surface.

Further, since the support 7X is formed such that the thickness increases as the lower end 7b gets closer to the display main body 2, the strength of the portion connected with the display main body 2 in the support 7X is large and the display main body 2 can be stably held.

Further, since the left-right width is larger than the front-back width in the support 7X, the front-back and left-right sizes of the support 7X are the same as the front-back and left-right sizes of the display main body 2, and particularly, the display main body 2 is prevented from inclining in the left-right direction, such that display main body 2 can be kept stably held.

As described above, since the attachment base 6X and the outer coating 9b of support 7X in the stand 3X are integrally formed, it is possible to reduce the number of parts and keep the display main body 2 stably held, with high strength of the stand 3X.

Further, in the display device 1X, it is possible to integrally form the outer coating 9b of the support 7X and the housing 4 of the display main body 2. As the outer coating 9b of support 7X and the housing 4 are integrally formed, the connection strength of the support 7X to the display main body 2 is increased, such that it is possible to reduce the number of parts and keep the display main body 2 stably held.

Since the outer coating 9b is made of a resin material containing the reinforcing material, it is possible to ensure high strength for the support 7X, and thus, it is possible to reduce the size. For example, when the display main body 2 weighs about 12 Kg, the support 7X can sufficiently and stably hold the display main body 2, even if the size of the support 7X is about 10 mm.

Further, the same as the display device 1 according to the first embodiment, the configurations of the supports 7, 7B, . . . of the modified examples described above (see FIGS. 10 to 18) can also be applied to the display device 1X according to the second embodiment.

Further, the strength of the supports 7X of the display devices 1X is the same as the strength of the support 7 of the display device 1.

<Third Embodiment>

Figure 21:
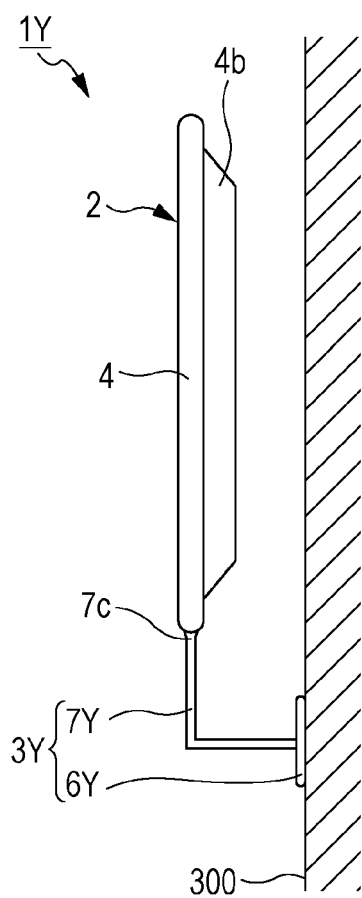
FIG. 21 is a side view showing an example of bending a support at a right angle, which shows a display device according to a third embodiment together with FIGS. 22 and 23.
Figure 22:
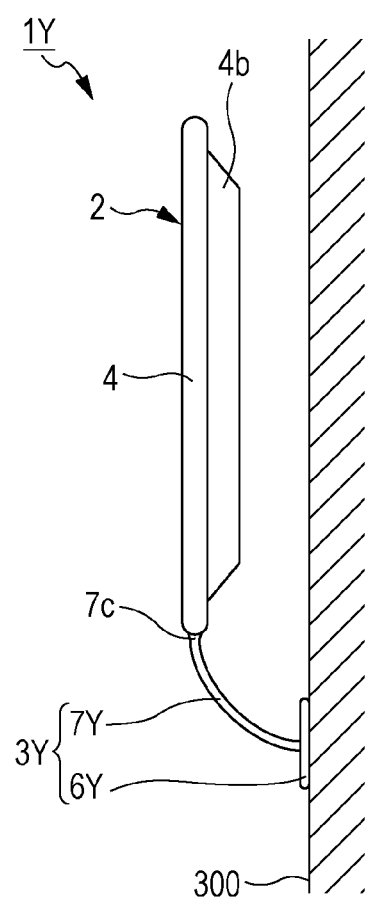
FIG. 22 is a side view showing an example of a curved support.
Figure 23:
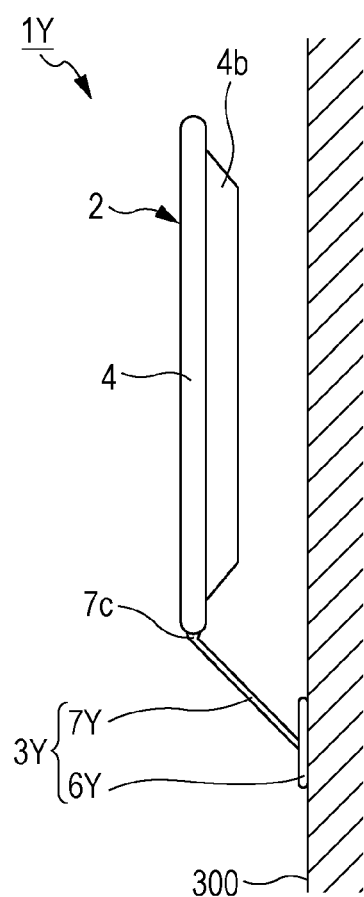
FIG. 23 is a side view of an example of an inclined support.

A display device 1Y according to a third embodiment is described next (see FIGS. 21 to 23).

Further, the display device 1Y according to the third embodiment is different in the type in which it is attached to a wall, as compared with the display device 1 according to the first embodiment described above, such that only the different portions from the display device 1 in the display device 1Y according to the third embodiment are described. Therefore, the components of the display device 1Y, which are the same as those of the display device 1, are given the same reference numerals as those of the display device 1.

The display device 1Y includes a display main body 2 that displays an image and a stand 3Y attached to a wall 300 and holding the display main body 2.

The stand 3Y is composed of an attachment base 6Y and a support 7Y.

The attachment base 6Y is formed in a plate shape in the up-down direction, and for example, made of resin.

The support 7Y is formed to be bent at right angle (see FIG. 21) and protrudes forward from the attachment base 6Y. Further, the support 7Y is not limited in the shape bending at right angle, and for example, it may be formed to be curved (see FIG. 22) or may be formed to protrude upward and forward straight from the attachment base 6Y (see FIG. 23).

The support 7Y, for example, is composed of two cables 8 and 8, a coating 9 covering the outer circumferential surfaces of the cables 8 and 8, and a cover 10 covering the outer side of the coating 9.

The outer coating 9b of the support 7Y is formed, for example, integrally with the attachment base 6Y.

Further, the number of the cables 8 is not limited to two, and a certain number for supplying power and inputting/outputting signals may be possible or only one cable 8 may be disposed to supply power when signals are wirelessly input/output to/from the display main body 2.

The support 7Y is connected, at the upper end 7c, to the lower end of the display main body 2 and the upper end 7c is formed to become thicker toward the display main body 2. The support 7Y, for example, includes two cables 8 and 8 disposed in parallel at the left and right, and accordingly, the left-right width is larger than the front-back width.

The upper end 7c of the support 7Y is connected to the housing 4 of the display main body 2. The position where the upper end 7c of the support 7Y is connected to the housing is, for example, the center portion in the left-right direction of the lower surface of the housing 4.

As the upper end 7c of the support 7Y is connected to the lower end of the housing 4, the display main body 2 is supported from below, such that it is possible to keep the display main body 2 stably held.

Further, as the support 7Y is connected to the center portion in the left-right direction of the housing 4 of the display main body 2, the left-right balance of the display main body 2 is favorably kept, such that it is possible to keep the display main body 2 stably held.

Further, the position where the upper end 7c of the support 7Y is connected to the housing 4 may be on the rear surface of the housing, and when the upper end 7c of the support 7Y is connected to the rear surface of the housing 4, the connection position is preferably the center portion in the left-right direction of the rear surface.

Further, since the support 7Y is formed such that the thickness increases as the upper end 7c gets closer to the display main body 2, the strength of the portion connected with the display main body 2 in the support 7Y is large and the display main body 2 can be stably held.

Further, since the left-right width is larger than the front-back width in the support 7Y, the front-back and left-right sizes of the support 7Y are the same as the front-back and left-right sizes of the display main body 2, and particularly, the display main body 2 is prevented from inclining in the left-right direction, such that display main body 2 can be kept stably held.

As described above, since the attachment base 6Y and the outer coating 9b of support 7Y in the stand 3Y are integrally formed, it is possible to reduce the number of parts and keep the display main body 2 stably held, with high strength of the stand 3Y.

Further, in the display device 1Y, it is possible to integrally form the outer coating 9b of the support 7Y and the housing 4 of the display main body 2. As the outer coating 9b of support 7Y and the housing 4 of the display main body 2 are integrally formed, the connection strength of the support 7Y to the display main body 2 is increased, such that it is possible to reduce the number of parts and keep the display main body 2 stably held.

Since the outer coating 9b is made of a resin material containing the reinforcing material, it is possible to ensure high strength for the support 7Y, and thus, it is possible to reduce the size. For example, when the display main body 2 weighs about 12 Kg, the support 7Y can sufficiently and stably hold the display main body 2, even if the size of the support 7Y is about 10 mm.

Further, the same as the display device 1 according to the first embodiment and the display device 1X according to the second embodiment, the configurations of the supports 7, 7B, . . . of the modified examples described above (see FIGS. 10 to 18) can also be applied to the display device 1Y.

Further, the strength of the supports 7Y of the display device 1Y is the same as the strength of the supports 7 and 7X of the display device 1 and the display device 1X.

Further, in the display device 1Y according to the third embodiment, although it was exemplified above when the display main body 2 is supported from below by the stand 3Y, in contrast, the display main body 2 may be supported from above by the stand 3Y.

Conclusion

As described above, in the display devices 1, 1A, 1B, 1C, 1D, 1E, 1F, 1G, 1H, 1I, 1X, and 1Y, the support 7 (7B, 7C, . . . ) with one end connected to the display main body 2 and the other end connected to the stand base 6 or the attachment bases 6X and 6Y includes the cables 8 and the coating 9 covering the cables 8.

Therefore, the cables 8 are not exposed to the outside of the display main body 2 while sagging from the display main body 2 and do not interfere with the works or opening or attaching the display device 1 (1A, 1B, . . . ) to the mounting surface 100, the ceiling 200, and the wall 300. Further, unnecessary force is not applied to the cables 8 and the cables 8 are not disconnected.

Further, since the cables 8 are disposed in the support 7 (7B, 7C, . . . ), it is possible to improve the external appearance while improving spatial efficiency, with the display main body 2 keeping stably held.

Further, as the coating 9 is made of a material in which carbon used as a reinforcing material is contained in resin used as the base material, it is possible to ensure high strength of the support 7 (7B, 7C, . . . ) even from a small thickness, such that it is possible to keep the display main body 2 stably held.

Further, since the coating 9 is composed of the inner coating 9a covering the cables 8 and the outer coating 9b covering the outer circumferential surface of the inner coating 9a, the coating 9 has a double structure and the selection range of the material of the coating 9 increases, such that it is possible to improve the degree of freedom in design.

The detailed shapes and structures of the parts described in the preferred embodiments described above are just examples of the details for implementing the present disclosure and the technical range of the present disclosure should not be construed as being limited.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
a display main body having a housing having an opening formed through the front surface and a display unit attached to the housing to close the opening and displaying an image;
a stand base placeable on a mounting surface; and
a support connected to the display main body at one end and connected to the stand base at the other end,
wherein the support includes a cable inputting/outputting power or signals to/from the display main body and a coating covering the cable,
wherein the coating includes an inner coating covering the cable and an outer coating covering an outer circumferential surface of the inner coating, in which the inner coating is formed of a first material and the outer coating is formed of a second material which is different from said first material,
wherein when facing the display unit the support has a left-right width which is larger than a front-back width, and in which the left-right width has a value of 12 milli-meters or less and the front-back width has a value of 9 milli-meters or less except at an end of the support connected to the display main body, and
wherein the support has a length between the display main body and the stand base within a range of 300 millimeters to 900 millimeters.

2. The display device according to claim 1,
wherein the end of the support is connected to the center portion in the left-right direction of the display main body.

3. The display device according to claim 1,
wherein one end of the support is connected to the lower surface of the display main body.

4. The display device according to claim 1, wherein the thickness of one end of the support increases toward the display main body.

5. The display device according to claim 1, further comprising at least one additional support.

6. The display device according to claim 1, wherein the housing of the display main body and the outer coating of the support are integrally formed.

7. The display device according to claim 1, wherein the stand base and the coating of the support are integrally formed.

8. A display device comprising:
a display main body having a housing having an opening formed through the front surface and a display unit attached to the housing to close the opening and displaying an image;
an attachment base attached to a ceiling or a wall; and
a support connected to the display main body at one end and connected to the attachment base at the other end,
wherein the support includes a cable inputting/outputting power or signals to/from the display main body and a coating covering the cable,
wherein the coating includes an inner coating covering the cable and an outer coating covering an outer circumferential surface of the inner coating, in which the inner coating is formed of a first material and the outer coating is formed of a second material which is different from said first material,
wherein when facing the display unit the support has a left-right width which is larger than a front-back width, and in which the left-right width has a value of 12 millimeters or less and the front-back width has a value of 9 milli-meters or less except at an end of the support connected to the display main body, and
wherein the support has a length within a range of 300 millimeters to 900 millimeters.

9. The display device according to claim 8, wherein the end of the support is connected to the center portion in the left-right direction of the display main body.

10. The display device according to claim 8, wherein the end of the support is connected to the upper surface or the lower surface of the display main body.

11. The display device according to claim 8, wherein the thickness of one end of the support increases toward the display main body.

12. The display device according to claim 8, further comprising at least one additional support.

13. The display device according to claim 8, wherein the housing of the display main body and the coating of the support are integrally formed.

14. The display device according to claim 8, wherein the attachment base and the coating of the support are integrally formed.

15. The display device according to claim 1, wherein said second material, used for forming the outer coating which covers the outer circumferential surface of the inner coating, includes an unidirectional (UD) material which is aligned in only one direction as a carbon fiber used as a reinforcing material contained in resin used as a base material.

16. The display device according to claim 8, wherein said second material, used for forming the outer coating which covers the outer circumferential surface of the inner coating, includes an unidirectional (UD) material which is aligned in only one direction as a carbon fiber used as a reinforcing material contained in resin used as a base material.

17. The display device according to claim 1, wherein the display main body has a weight of 12 kilograms.

18. The display device according to claim 8, wherein the display main body has a weight of 12 kilograms.

* * * * *